Feb. 11, 1964  J. D. SAINT-AMOUR ETAL  3,121,191
CONTINUOUS READING METER RELAY WITH PIVOTAL CONTACTS
Filed Jan. 17, 1961  3 Sheets-Sheet 1

INVENTORS.
JOHN D. SAINT-AMOUR &
GEORGE F. QUITTNER
BY
Richard MacCutcheon
ATTY.

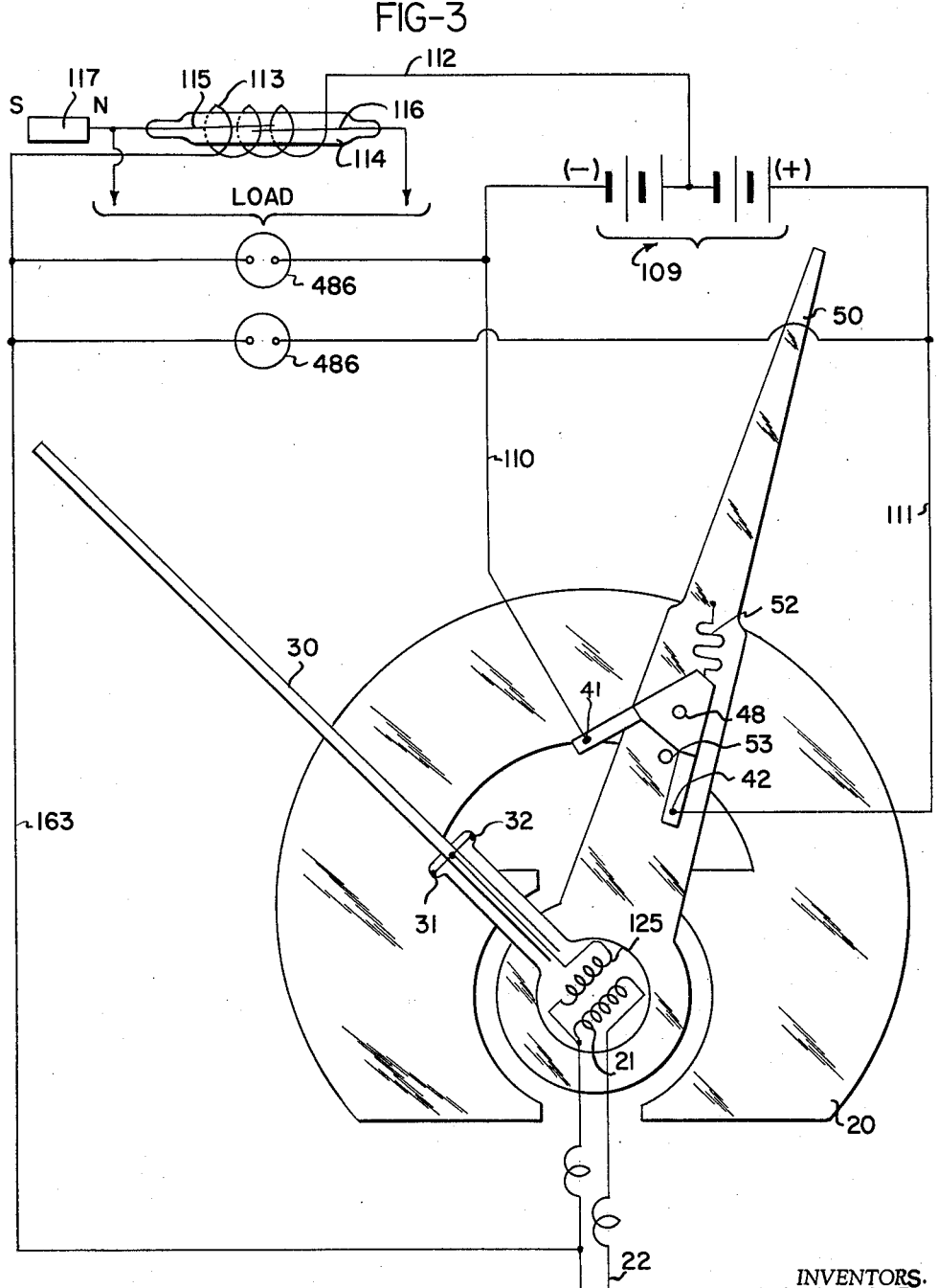

Feb. 11, 1964   J. D. SAINT-AMOUR ETAL   3,121,191
CONTINUOUS READING METER RELAY WITH PIVOTAL CONTACTS
Filed Jan. 17, 1961   3 Sheets-Sheet 3
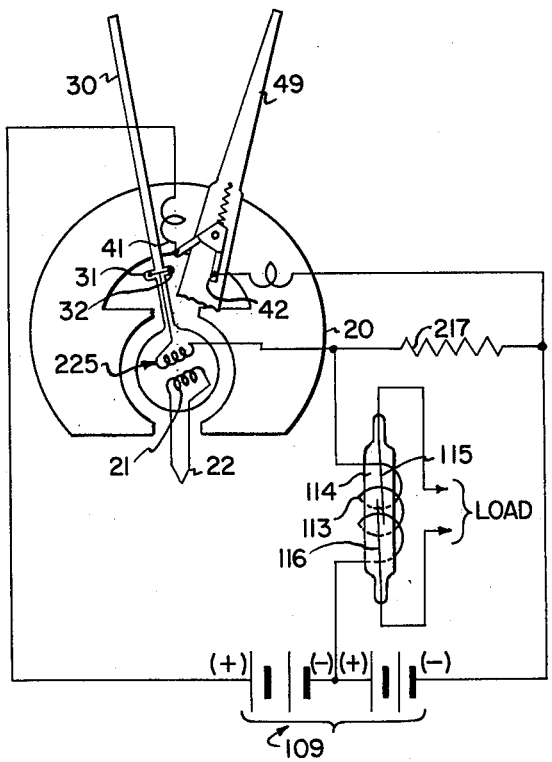
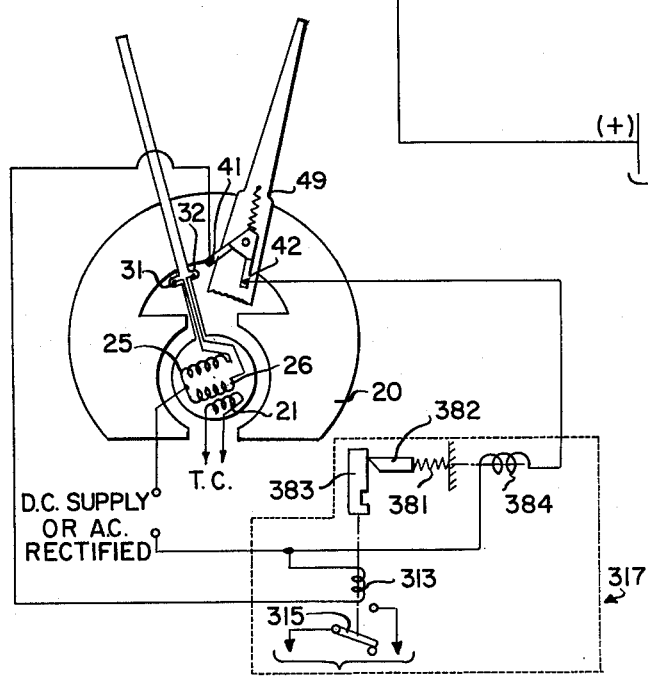
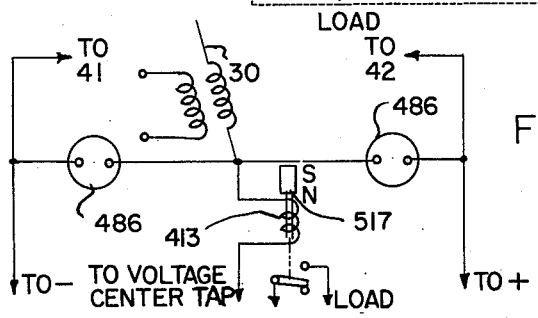
INVENTORS.
JOHN D. SAINT-AMOUR &
GEORGE F. QUITTNER
BY
Richard MacCutcheon
ATTY.

United States Patent Office 3,121,191
Patented Feb. 11, 1964

3,121,191
CONTINUOUS READING METER RELAY WITH PIVOTAL CONTACTS
John D. Saint-Amour, Chesterland, and George F. Quittner, Cleveland Heights, Ohio, assignors to Assembly Products, Inc., Chesterland, Ohio, a corporation of Ohio
Filed Jan. 17, 1961, Ser. No. 83,335
9 Claims. (Cl. 317—157)

The present invention relates to electrical control and has particular significance in connection with electrical circuits and mechanical arrangements for galvanometer-type meter relays provided with contacts, and the present invention is an improvement upon the arrangements shown, described and claimed in copending patent application Serial No. 833,274, filed August 12, 1959, in the names of G. J. Crowdes, H. R. Hausdorf and G. E. Hammond, and assigned to the assignee of the present invention.

It has long been known to employ electric contact devices of the type having a movable coil rotating within or about a permanent magnet to rotate a pointer thereby operating contacts for making or breaking an electrical circuit when a predetermined coil position is reached. Such a device has the advantage of extreme sensitivity but has a signal response so delicate it does not of itself develop sufficient torque to make reliable contact for control or indicating purposes. A booster coil, for the purpose of increasing the pressure between the contacts locking them together when they first meet, has been found useful as explained in many patents of the prior art, but one disadvantage heretofore has been the added expense, bulk, and maintenance difficulties caused by the necessity of providing additional apparatus to interrupt the locking coil current after it has served its function (in order that the meter may again be responsive only to sensitive coil current). An additional difficulty has been occasioned by the fact that the instrument, whenever provided with a dial plate so as to serve as a meter in addition to its relay function, could not provide scale readings outside of the limits determined by one or two (one for each direction of travel) relatively stationary limit contacts.

In the above mentioned co-pending patent application full scale readings are provided, and the need of any additional interrupter apparatus is obviated, by providing one or more pivotal (i.e., throwable) contacts which mate with a meter pointer contact but are then adapted to be "thrown" out of the way, as by providing a burst of higher than normal locking coil current. But providing two values of locking coil current (one for control and one for later pull through) introduced complexities in the way of requisite associate apparatus, as well as maintenance difficulties and slow response characteristics.

It is an object of the present invention to provide simple and inexpensive means for overcoming the above mentioned difficulties.

Other objects and advantages will become apparent, and the invention may be better understood, from consideration of the following description, taken in connection with the accompanying drawing, in which:

FIG. 2-6 are diagrammatical illustrations which show modifications.

Figure 1:
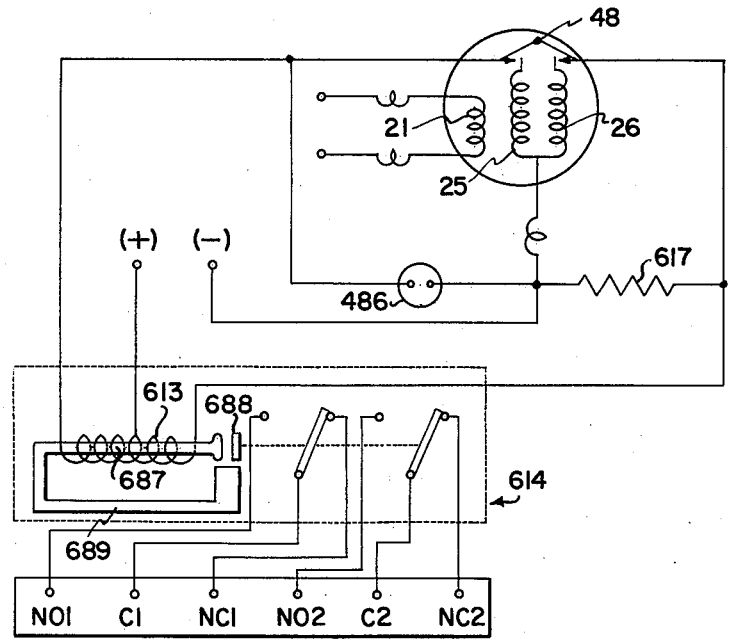
FIG. 1 is a circuit diagram showing a preferred embodiment of an improved control and/or indicating system according to the present invention.

For ease of understanding, we will refer first to FIG. 3, in which like parts are like numbered as in the co-pending application, and thus a contact meter is assumed provided with a permanent magnet 20 reactive to which a signal coil indicated diagrammatically at 21 turns responsive to changes in a minute quantity of a signal coil current introduced as from a thermocouple 22 located in some space in which temperature is to be measured. Mounted to rotate with coil 21 is, for the FIG. 3 arrangement, a single locking coil 125 which provides an additional or boosting torque.

For indicating, a pointer 30 may cooperate with a suitably marked scale plate (not shown) and either a separate pointer or, as illustrated, contact portions 31—32 of the indicating pointer may be used to mate with relatively stationary contacts at desired limits to complete circuits for relaying, to cause additional or locking torque to aid sensitive coil torque at the time of contact mating thereby to avoid chattering of the contacts, arcing, etc., and also to "throw" the respective stationary contact and allow readings outside of its limit.

As in the co-pending application, the stationary contacts are two "throwable" contacts 41, 42 mutually insulated one from the other while mounted upon or as arms movable around a single pivot 48 on a manually adjustable set pointer 50. The movement of contacts 41, 42 is in part restrained by a spring 52 operating to rotate the contact assembly one way or the other against a stop post 53.

In accordance with more or less conventional practice, one end of the locking coil is connected to the pointer contacts 31, 32, and the opposite end of the locking coil is connected for convenience by a wire to one end of the sensitive coil 21.

According to the arrangement in FIG. 3, a three wire source of voltage supply such as a center tap battery 109 is used to provide one direction of locking coil current for one direction of needle travel and an opposite direction of locking coil current for the opposite direction of needle travel (as is old in the art). As shown in FIG. 3, the "—" side of the battery 109 is connected through a lead 110 to the relatively stationary throwable contact 41, while the "+" side of the battery is connected through a lead 111 with the relatively stationary throwable contact 42 on the toggle mechanism, while at zero potential a center tap lead 112 leads to a coil 113 which is wound on a glass envelope 114 providing an inert gas filled (or evacuated) enclosure for a pair of magnetic contacts 115, 116. The contacts 115, 116 form a so-called reed switch. Such a reed switch assembly of a sealed enclosure 114 with resilient "soft" magnetic contacts is presently available as a standard article of manufacture, for example, from Gordos Corp., 252 Gleenwood Ave., Bloomfield, New Jersey. The contacts are of a "soft" (i.e. low rententivity) flexible magnetic material as by being made of soft iron, and for FIG. 3 a small permanent magnet 117 attached to one end of one of them sets up a magnetic bias which holds the contacts together when they are together but is insufficient to bring the contacts together when they are apart so that the relay acts as a polarized and "latching" relay staying shut when it is shut regardless of discontinuation of the energization which caused it to shut, and staying open when it is open regardless of discontinuation of opening energization.

According to the circuitry of FIG. 3 the solenoid 113 on the outside of the tube enclosing the reed switch acts to actuate the switch when the solenoid is energized through leads such as 112 and 163 by the mating of the meter relay contacts. As a specific illustration of the operation of this type of circuit, assume that solenoid 113 is so wound and connected that when lead 112 is negative with respect to lead 163, so that current flows from left to right in 113, the electromagnet field due to permanent magnet 117 is increased by the solenoid. Assume further that switch 114 is open as a result of previous operations. When the temperature of the space being measured by thermocouple 22 rises, causing sufficient additional current to flow through signal coil 21 to move pointer 30 upscale until pointer 30 is approximately in line with the reading on a scale (not shown) to which the manually adjustable set pointer 30 has been previously set, contact 32 on signal pointer 30 will mate with contact 42. Current then flows from the "+" terminal of battery 109, through contacts 42 and 32, down signal pointer 30 to locking coil 125, where it adds greatly to the torque pressing contact 32 against contact 42. Leaving locking coil 125 the current flows out of the common lead shared by locking and signal coils and out lead 163 to the left end of solenoid 113 aiding the field produced by the permanent magnet 117. The circuit is completed from solenoid 113 via lead 112 back into the relatively "—" center tap of battery 109. The current which thus flows is sufficient not only to close switch 114, but to force contact 32 against contact 42 so strongly that the force of spring 52 is overcome, and the structure to which contacts 41 and 42 are attached swivels about axis 48, "throwing" the contacts. Once spring 52 is compressed by swiveling of the contact bearing structure through slightly over half its arc of available motion, the force of spring 52 assists that swiveling until the contact structure rests with contact 41 adjacent to stop 53. Pointer 30 is now free to swing to the right of pointer 50, since contact 42 is now out of the path of contact 32. Although current no longer flows in solenoid 113, the contacts 115 and 116 of reed switch 114 remain closed because of the locking action of the field of permanent magnet 117.

When the temperature of the space being measured by thermocouple 22 drops, pointer 30 drops downscale, and when contact 31 mates with contact 41 (which now is in the arc of pointer contact motion) current again flows, but it now leaves a relatively "+" center tap of battery 109, flows via lead 112 from right to left in solenoid 113, and by way of lead 163, it flows oppositely to the previously described direction through the meter locking coil 125, then up the pointer and, via contacts 31 and 41, back to the "—" terminal of battery 109. With this reversal of locking coil current, as compared to the previously described condition, contact 31 is urged forcefully against contact 41. Similarly, current through solenoid 113 now flows in a direction to oppose, and more than cancel, the field of magnet 117, permitting switch spring contacts 115 and 116 to separate. Contact 41 is pressed until the contact 41—42 structure is "thrown" and the conditions assumed for the beginning of this description resume. We have found that the conditions for performing the above operations are surprisingly and fortuitously non-critical. For example, coils having a wide range of ampere-turns may be used for solenoid 113, and, the voltage of battery 109 can vary in excess of 20% without causing improper circuit operation. Apparently several causes interact to contribute to this condition. For instance, if there are far "too many" ampere-turns in solenoid 113 one might anticipate the problem in opening switch 114 that not only would the field of magnet 117 be cancelled, but a strong enough field would be built up in the opposite sense causing the switch to reclose after opening momentarily. That this does not easily occur may be attributed to the combination of circumstances that (1) the period of time during which the locking circuit remains closed decreases when the value of the current is increased, because the contacts are thrown more vigorously, and (2) as soon as switch 114 contacts 115 and 116 begin moving apart the attraction tending to hold them together decreases very rapidly in accordance with the square law, and their momentum tends to carry them further apart than they would be at their open rest position, so that a far greater field than normal is momentarily required to bring them back together. The non-criticality of the circuit contributes materially to the ease and low cost of manufacture and to the reliability of the device under field conditions, and, with an arrangement as described, two values of locking current (one for control and one for later pull-through as described in the copending application) are no longer necessary.

With the arrangement of FIG. 3, since sufficient locking coil current to throw the toggle need only be on the order of 100 milliamps at 10 volts, the apparatus can (because the current is drawn for only a few milliseconds for each operation) operate as many as 3,000,000 times without exhausting a battery of only moderate capacity, while also eliminating the many complexities (of extra control contacts, rectifier, and differing values of resistance) which had to be provided according to the copending application.

But the arrangement of FIG. 4 is even more simplified. In FIG. 4, with like parts like numbered as before, a contact meter is assumed provided with a permanent magnet 20 and a single locking coil 225.

Pointer 30 has contacts 31, 32 used to mate with relatively stationary but throwable contacts 41, 42 at desired limits to "throw" the respective stationary contact and allow readings outside of its limit.

In FIG. 4 the center tap battery 109, has its "+" terminal connected to meter contact 41 and its "—" terminal connected to meter contact 42. Reed contacts 115—116 are connected to the load (not shown) and are "latched" one way or the other by an associated solenoid coil 113. In the embodiment of FIG. 4 there is no permanent magnet material member for providing bias and instead, an equipment magnetic bias is provided electrically through a continuously energized resistor 217, which permits a small continuous current flow through solenoid 113. The small permanent magnet 117 attached to one end of one of the reed contacts (FIG. 3) could provide only a weak flux, having no return path except through air. Providing magnetic bias with a resistance as in FIG. 4 simplifies the reed switch and makes it more adjustable, but has the disadvantage of always drawing current for bias. And with or without such a drain the use of batteries in a control system is often considered disadvantageous, whereas to do the same job with A.C. the split power supply introduces the complexities of a center tapped winding in the power transformer, plural rectifiers, plural condensers, etc., while the use of a center tap resistance would be wasteful and inefficient.

These disadvantages are obviated by two locking coil arrangement of FIG. 5 where 317 might be a two coil magnetically or otherwise latched relay but is pictured as of the mechanical latch type. This, too, like the magnetic reed switches of FIGS. 3 and 4, is available as a standard article of manufacture and in FIG. 5 the mechanical latch type relay 317 is closed by momentarily energizing a closing coil 313. Subsequently no current is required to hold the contacts 315 in the closed position, the relay being held closed by spring 381 biased mechanical latch 382, 383. Energizing a second coil 384 trips the latch and opens the relay contacts. Such a "Memory" relay, which is unaffected by de-energization of either of two coils, is available either as a latch release for example as Type BXL from Allen-Bradley Co., Milwaukee, Wisconsin, or as a two coil non-mechanical latching relay which stays in or out until the coil opposite the last coil energized is energized.

With the arrangements as thus far described there is either the relative disadvantage of two locking coils (as in FIG. 5 and in the disclosure of the copending application) which adds to the weight of the delicate meter movement and affects its inertia as well as its cost, or else there is the disadvantage of a double (or center tap) voltage supply.

There is a further disadvantage with the FIG. 5 embodiment, in that any mechanical latch type relay will be too large and cumbersome to fit within a usual extension of the standard barrel for the meter movement and thus the entire control cannot be sold as a complete small part. All of the arrangements are disadvantageous if the inductive kick of the solenoid coil causes arcing at the meter contacts as the toggle is thrown. And any of the arrangements are disadvantageous if they can operate out of step, particularly in steps after a first step when the control circuit is first energized and the sensitive pointer may either be inside, or outside, of the toggle, and the toggle may have been previously thrown either one way or the other.

The present application has its basis in part in our invention or discovery that even an ordinary relay can be polarized electrically or magnetically for use in connection with circuitry for a toggle meter as is about to be described.

Figure 2:
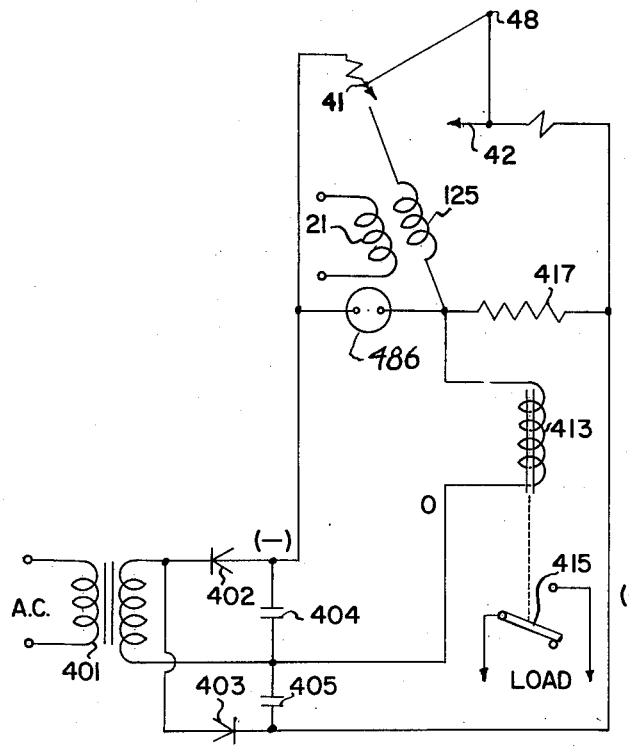

FIG. 2 is a simplified schematic diagram in which the relatively stationary contacts 41, 42 are assumed to be part of a toggle mounted on an adjustable pointer, as before, and 125 is a single locking coil. Here a two wire source of A.C. feeds a transformer 401 and split voltage D.C. is furnished by rectifiers 402, 403 around which may be smoothing capacitors 404, 405. An ordinary load relay having a coil 413 and contacts 415 has its coil connected between locking coil and voltage neutral. This has the advantage that the relay may be a standard part, with plenty of contacts available if needed, and it is made operably polarized by the provision of resistor 417 from load relay coil to one side of the line and which serves to electrically polarize the coil 413 to give it a permanent pole or bias so that when the pointer 30 mates with contact 42, causing a greater flow of current, the relay will close and then, because of the bias, stay closed even after the toggle is thrown. Conversely when the pointer 30 engages the contact 41 of opposite polarity an opposite flow of current overcomes the bias and causes the load relay to open, and, because of the value selected for 417, it stays open until the cycle repeats.

The resistance 417 also helps prevent overvoltage due to relay coil inductive kick during opening of 30—42 (as the toggle is thrown). The other side (contact 41) is protected by a high voltage breakdown device such as a neon glow lamp 486 so that when the voltage across the device exceeds a critical value its internal resistance abruptly drops to a relatively low value, but when the current through it subsequently drops below a critical value it abruptly reacquires its relatively very high value of internal resistance. Suitable semi-conductor diodes could be used in place of the neon tubes.

FIG. 6 is a detail to show an arrangement presumed otherwise exactly the same as in FIG. 2 but with the relay winding 413 having a core permanently magnetized as by adding a small "hard" permanently magnetized portion 517 of high coercive force characteristic (to prevent demagnetization), obviating the need of resistor (417 in FIG. 2) which is replaced (in FIG. 6) by another breakdown diode 486 to protect the meter relay contacts. Various modifications may obviously be made and the permanent magnet could be eliminated by substituting a second winding in the relay wound coaxially with the control winding and with enough D.C. passing through it to provide the equivalent of a magnet while being much easier to adjust.

The arrangements of FIGS. 2 and 6 have the advantage that upon start-up there will not be a false step made more than once, that only a single locking coil is required, and that a standard relay with as many contacts as desired can be used. Disadvantages for these arrangements are that a double power supply is required, and for FIG. 4 that the electrical polarization (through a resistor) will always draw a current.

A preferred arrangement is shown in FIG. 1 where a double locking coil toggle type meter relay has only a single two wire power supply and has a center tapped coil load relay 614. The relay has a center tapped or two part coil means 613 one of whose parts is polarized by a resistor 617. But it should be understood that this is not essential, nor need a permanent magnet be added as a separate part. In conventional relay structure there is usually a solenoid coil surrounded magnetic material core portion (see 687 in FIG. 1), a movable (contact moving) magnetic material armature portion (688), and a magnetic material flux return path portion (689). If any or all of these are of only "semi-soft" magnetic material of sufficient coercive characteristic, it (or they) can be permanently magnetized by some outside influence (not shown) and then provide a permanent bias or polarization so that the two coil relay, which would not otherwise be "polarized," is polarized. The whole arrangement will fit within the barrel extension of a standard meter relay of a type already provided with toggle mechanism, the advantage of not making a false step more than once is retained, the single power supply advantage is realized, and many contacts on the load relay are made available, while at the same time 614 per se need not be what the manufacturers of such two coil relays would call a latching or polarized (and thus more expensive) relay.

While we have illustrated and described particular embodiments, various modifications may obviously be made without departing from the true spirit and scope of the invention which is intended to be defined only by the accompanying claims taken with all reasonable equivalents.

We claim:

1. For use with a contact meter of the type having coil means and a magnetic field within which said coil means is rotatable and contact means rotatable with the coil means and electrically connected to the coil means and a co-operating relatively fixed while throwable contact having a first operative position in which it is engageable by the rotatable contact means and a second thrown position at which it is not engageable by the rotatable contact means but into which it is movable from the first position by reason of the torque exerted by the coil means so as to open the switch formed by the two contacts and allow the coil means substantial further freedom of movement: a control voltage source; a load relay having at least one coil; means including connections for establishing a loop circuit which comprises, in any sequence, (1) source, (2) load relay coil, (3) throwable contact, (4) rotatable contact means, and (5) meter coil means; said load relay having load contacts arranged to be actuated by energization of said load relay coil while having no contacts in said loop circuit; and means associated with and arranged with respect to said load relay to prevent subsequent actuation of said load relay contacts with subsequent de-energization of said load relay coil as the throwable contact is thrown from first to second position so that it is no longer engaged by the movable contact means of the meter and the loop circuit is thereby broken.

2. The combination as in claim 1 further characterized by the means to prevent subsequent actuation of load relay contacts comprising a resistor connected in an inner loop with source and load relay coil whereby to substantially permanently provide a bias to said relay coil from said source.

3. The combination as in claim 1 further characterized by the means to prevent subsequent actuation of load relay contacts comprising permanent magnetization of at least one part associated with the load relay structure.

4. The combination as in claim 1 further characterized by the load relay being a reed type switch having soft magnetic material contacts surrounded by the relay coil and the last mentioned means being a permanent magnet associated with an end of one of said contacts.

5. The combination as in claim 1 further characterized by the load relay being a reed type switch having soft magnetic material contacts surrounded by the relay coil, and the last mentioned means being a resistor which in series with the relay coil is substantially permanently across the source to provide an electromagnetic bias for the relay.

6. The combination as in claim 1 further characterized by the last mentioned means including a mechanical latching mechanism and an added coil in said load relay for resetting said latching mechanism.

7. For use with a load to be controlled indirectly by a meter of the type having a signal coil rotatable by reaction with a permanent magnet and having an indicating pointer and contact means rotatable with the rotatable signal coil and having locking coil means mounted for rotation with the signal coil and having a manually adjustable "set" pointer and having a member pivoted on the last mentioned pointer while bifurcated and spring biased with respect to a portion of said set pointer with arms of the bifurcated member each comprising one of a pair of relatively stationary contacts which are throwable by the pivotal action of said bifurcated member for selectively mating one or the other of said contacts with the movable contact means according to position of said member and of the first mentioned pointer: means including connections for applying a signal to the signal coil; a source of control power current; a load relay having contacts and coil means; a first locking coil circuit comprising at least a portion of said source, at least a portion of the relay coil means, one of the throwable contacts, and at least a portion of the locking coil means; another locking coil circuit comprising at least a portion of said source, at least a portion of the relay coil means, the other of the throwable contacts, and at least a portion of the locking coil means; a resistor associated with one of said locking coil circuits and for supplying from the source a constant current to the relay coil means included portion to provide the same with a bias independent of position of rotatable contact means and the associate throwable contact of the meter; and the other of said locking coil circuits having a breakdown diode connected substantially permanently in a circuit which parallels the associate portion of the locking coil means, rotatable contact means and throwable contact means for protecting the contacts upon opening.

8. The combination as in claim 7 further characterized by the relay coil means being a center tap coil, the source of control power being a two wire source having one wire thereof connected to the center tap of said relay coil while the other wire is in circuit with the locking coil means, and the two throwable contacts being connected one in circuit with one end of said center tap coil and the other in circuit with the other end thereof.

9. The combination as in claim 7 further characterized by the control power source including a transformer and rectifiers which establish a three wire source of direct current, the relay coil means being a single coil having one leg connected to the neutral wire of the three wire direct current source while the outer wires of said three wire source are connected one to one of the throwable contacts and the other to the other of the throwable contacts.

References Cited in the file of this patent

UNITED STATES PATENTS

| | | |
|---|---|---|
| 2,042,109 | Lamb | May 26, 1936 |
| 2,109,872 | Uehling | Mar. 1, 1938 |
| 2,113,737 | McMaster | Apr. 12, 1938 |
| 2,835,734 | Fisher | May 20, 1958 |